US 6,722,988 B2

(12) United States Patent
Yamaguchi (10) Patent No.: US 6,722,988 B2
(45) Date of Patent: Apr. 20, 2004

(54) GAME SYSTEM AND COMPUTER READABLE STORAGE MEDIUM THEREFOR

(75) Inventor: Jun Yamaguchi, Nagoya (JP)

(73) Assignee: Konami Corporation, Tokyo (JP)

( * ) Notice: Subject to any disclaimer, the term of this patent is extended or adjusted under 35 U.S.C. 154(b) by 577 days.

(21) Appl. No.: 09/772,568

(22) Filed: Jan. 30, 2001

(65) Prior Publication Data

US 2001/0012799 A1 Aug. 9, 2001

(30) Foreign Application Priority Data

Feb. 4, 2000 (JP) ..................................... P2000-032756

(51) Int. Cl.⁷ ................................................. A63F 9/24
(52) U.S. Cl. .......................................... 463/35; 463/43
(58) Field of Search .............................. 463/30–32, 35, 463/36–38, 43, 44

(56) References Cited

U.S. PATENT DOCUMENTS 5,735,743 A     4/1998  Murata et al.
6,464,585 B1 * 10/2002  Miyamoto et al. ............ 463/35

* cited by examiner

Primary Examiner—Kim Nguyen
(74) Attorney, Agent, or Firm—Jordan and Hamburg LLP

(57) ABSTRACT

The game system comprises a storage device for storing sound data, a game control device for reading the sound data corresponding to a predetermined scene of a game and outputting the same data, and a sound reproducing device for reproducing the sound data outputted from the game control device. The game control device detects the occurrence of a failure in reading the sound data. When detecting the reading failure of the sound data, the system copes with the failure by a direction somehow related to the world of the game.

11 Claims, 7 Drawing Sheets

Sound data A

| Code: N | Sound content to be reproduced at the ordinary time |
|---|---|
| 10 | Well, it's the first hole. |
| 11 | Tee shoot, how does he play? |
| 12 | He selects a driver. |
| 13 | Tee shoot |
| .. | .. |
| .. | .. |

FIG. 2B

Sound data B

| Code: M | Sound content to be reproduced at a time of detecting a failure resolution |
|---|---|
| 1 | We would apologize for the poor sound quality of the broadcast. |
| 2 | We would apologize to you. |
| 3 | We would apologize for some sound quality of the broadcast. |
| 4 | We would apologize for the sound lack in some region. |
| 5 | We would apologize for some sound trouble. |
| . | .. |
| . | .. |
| . | .. |

Sound data C

| Code: 0 | sound content to be reproduced at a time of detecting occurrence of a failure | Sound content to be reproduced at a time of detecting a failure resolution |
|---|---|---|
| 111 | Beep, beep,..... | We would apologize for some poor sound quality of the broadcast. |
| 112 | Zzz, ... | We would apologize for the sound lack in some region. |
| 113 | Cough, coff-coff | We must apologize to you. |
| 114 | Ah-choo | We must apologize to you so much. |
| 115 | Z-z-z | Oh, I'm so sorry. |
| 116 | Cheep, cheep, ... | We would apologize for some sound trouble. |
| . | . | . |
| . | . | . |

| Sound data D | | | |
|---|---|---|---|
| Code: P | sound content to be reproduced at a time of detecting occurrence of a failure | Sound content to be reproduced at a time of detecting a failure resolution | Image data Image content to be displayed at a time of detecting occurrence of a failure |
| 1111 | Cheep, cheep... | We would apologize for some image and sound trouble of the broadcast. | Image of sand storm |
| 1112 | Zzz, zzz,... | There may be some disturbance in the satellite communication. The line has returned. | Image of contract test |
| . | . | . | . |

41, 42, 43

GAME SYSTEM AND COMPUTER READABLE STORAGE MEDIUM THEREFOR

BACKGROUND OF THE INVENTION

1. Field of the Invention

The present invention relates to a game system capable of advancing a game without destroying the world of a game.

2. Description of the Related Art

Hitherto, such a game system has been known that an announcer's commentary on the spot is reproduced as the sound in accordance with each scene of a game such as a golf game and a baseball game. In this kind of the game system, an announcer's running commentary is effective in raising realistic feeling of a game. However, disadvantage such as sound lack, sound skip, noise, disorder of uttering timing and the like often has occurred when reading out sound data from a storage medium of a game system.

In many cases, this disadvantage is a temporary phenomenon, and even if there occurs sound lack, sound skip, noise, or disorder of uttering timing, the next sound is reproduced without any countermeasures.

There has been a game system in which the game is interrupted with an error message displayed on a screen when this disadvantage occurs.

However, this disadvantage may cause a player disgust or irritation, destroying the world of a game awfully.

SUMMARY OF THE INVENTION

In view of the above background, it is an object of an object of the present invention to provide a game system capable of making a game progress without destroying the world of the game.

According to one aspect of the present invention, there is provided a game system including : a storage device for storing sound data; a game control device for reading out sound data corresponding to a predetermined scene within a game and outputting the same, and a sound reproducing device for reproducing the sound data outputted by the game control device, wherein the game control device system includes failure detecting means for detecting a failure in reading the sound data, and failure coping means for coping with a failure by direction somehow related to the world of a game when the reading failure of the sound data is detected.

By the present invention thus configured, the sound data is to be read out and reproduced in a predetermined scene of a game. When the reading failure of the sound data is detected, countermeasure against the failure is performed by direction somehow related to the world of the game. Accordingly, even when the reading failure of the sound data occurs, it is possible to advance a game without destroying the world of the game.

The direction may be to make believe that a disadvantage of sound caused by the reading failure of the sound data is a trouble which happened in the world of a game. Accordingly, even when there is a disadvantage of the sound data caused by the reading failure of the sound data, it is possible to make a player believe as if it were a prepared direction in the world of the game, hence to advance a game without destroying the world of the game.

The failure coping means may read out the sound data corresponding to the sound for making believe that a disadvantage of the sound caused by the reading failure of the sound data is a trouble which happened in the world of a game and outputs the same data to the sound reproducing device. Accordingly, even when there is a disadvantage of the sound caused by the reading failure of the sound data, it is possible to make a player believe as if it were a prepared trouble in the world of a game by giving the sound. Therefore, a game can be advanced without destroying the world of the game.

The game system may include an image display device for displaying an image of a game according to a predetermined signal outputted from the game control device, and that the failure coping means outputs a signal for disturbing an image for making believe that a disadvantage of the sound caused by the reading failure of the sound data is a trouble which happened in the world of a game, to the image display. Accordingly, even when there is a disadvantage of the sound caused by the reading failure of the sound data, it is possible to make a player believe as if this disturbance were a prepared trouble in the world of the game.

According to another aspect of the present invention, there is provided a game system including : a storage device for storing sound data, a game control device for reading out the sound data corresponding to a predetermined scene within a game and outputting the same, and a sound reproducing device for reproducing the sound data outputted by the game control device, wherein the game control device includes failure detecting means for detecting a failure in reading the sound data, failure resolution detecting means for detecting a resolution of the reading failure of the sound data, temporary storing means for reading out the sound data corresponding to effective sound for making believe that a disadvantage of the sound caused by the reading failure of the sound data is a trouble which happened in the world of a game, before the reading failure of the sound data occurs, and temporarily storing the same sound data, first failure coping means for reading out the sound data corresponding to the effective sound temporarily stored and outputting the same sound data to the sound reproducing device when the reading failure of the sound data is detected, and second failure coping means for reading out the sound data corresponding to the sound for making believe that a disadvantage of the sound caused by the reading failure of the sound data is a trouble which happened in the world of a game and outputting the same sound data to the sound reproducing device when the resolution of the reading failure of the sound data is detected.

By the present invention thus configured, the sound data is to be read out and reproduced in a predetermined scene of a game. The sound data corresponding to the effective sound is previously read out and temporarily stored in, for example, a buffer or the like. When a reading failure of the sound data is detected, the effective sound temporarily stored (for example, physical phenomenon like cough, hack, sneeze, snore and the like other than the noise) is reproduced. When the reading failure of the sound data is resolved, the sound for making believe that a disadvantage of the sound caused by the reading failure is a trouble which occurred in the world of a game, is reproduced. Accordingly, even when there is a disadvantage of the sound caused by the reading failure of the sound data, it is possible to make a player believe as if it were a prepared trouble in the world of a game, by giving the sound. Therefore, a game can be advanced without destroying the world of the game. The effective sound in accordance with the reading failure can be reproduced during the period from the occurrence of the reading failure to the return.

The first failure coping means may read out the sound data corresponding to the effective sound and repeatedly outputs the same sound data to the sound reproducing device until the resolution of the reading failure of the sound data is detected by the failure resolution detecting means. Accordingly, it is possible to make a player believe as if it were a prepared trouble in the world of a game until the reading failure of the sound data is resolved.

The second failure coping means may read out the sound data corresponding to the sound data reproduced by the first failure coping means and outputs the same sound data to the sound reproducing device. Accordingly, a combination of the effective sound reproduced by the first failure coping means and the sound reproduced by the second failure coping means enables much more effective direction.

The game system may comprise an image display device for displaying an image of a game according to a predetermined signal outputted by the game control device, and that the first failure coping means outputs a signal for disturbing an image for making believe that a disadvantage of the sound caused by the reading failure of the sound data is a trouble which happened in the world of a game, to the image display. Accordingly, even when there is a disadvantage of the sound caused by the reading failure of the sound data, it is possible to make a player believe as if this disturbance were a prepared trouble in the world of a game. Therefore, a game can be advanced without destroying the world of the game.

The game control device may read out the sound data corresponding to a scene within a game after performing the second failure coping means and outputs the same sound data to the sound reproducing device when the scene within the game after performing the second failure coping means advances from the scene within the game before the failure is detected by the failure detecting means. Accordingly, after the reading failure of the sound data is resolved, the sound depending on the game scene thereafter can be reproduced.

According to the third aspect of the present invention, there is constituted a computer readable storage medium carrying a program which executes a predetermined game , for a game system including a computer. And the program controls the computer to function as means for storing the sound data, means for reading out the sound data corresponding to a predetermined scene within a game and outputting the same sound data, means for reproducing the outputted sound data, means for detecting a failure in reading the sound data, and failure coping means for coping with a failure by direction somehow related to the world of a game when detecting the reading failure of the sound data.

According to an fourth aspect of the present invention, there is constituted a computer readable storage medium carrying a program which executes a predetermined game , for a game system including a computer. And the program controls the computer to function as means for storing the sound data, means for reading out the sound data corresponding to a predetermined scene within a game and outputting the same sound data, means for reproducing the outputted sound data, means for detecting a failure in reading the sound data, means for detecting a resolution of the reading failure of the sound data, means for reading out the sound data corresponding to the effective sound for making believe that a disadvantage of the sound caused by the reading failure of the sound data is a trouble which happened in the world of a game, before the reading failure of the sound data occurs, and temporarily storing the same sound data, means for reading out the sound data corresponding to the effective sound temporarily stored and outputting the same sound data to the sound reproducing device when detecting the reading failure of the sound data, and means for reading out the sound data corresponding to the sound for making believe that a disadvantage of the sound caused by the reading failure of the sound data is a trouble which happened in the world of a game and reproducing the same sound data when detecting the resolution of the reading failure of the sound data.

By the storage medium of the present invention, a computer can be served as the control device in the game system of the present invention, by making the computer read out and run the program. The storage medium includes a magnetic storage medium, an optical storage medium, an optical magnetic storage medium, a semiconductor memory and the other storing means.

DETAILED DESCRIPTION OF THE PREFERRED EMBODIMENT

The preferred embodiment of the present invention will now be described below with reference to the attached drawings.

Figure 1:
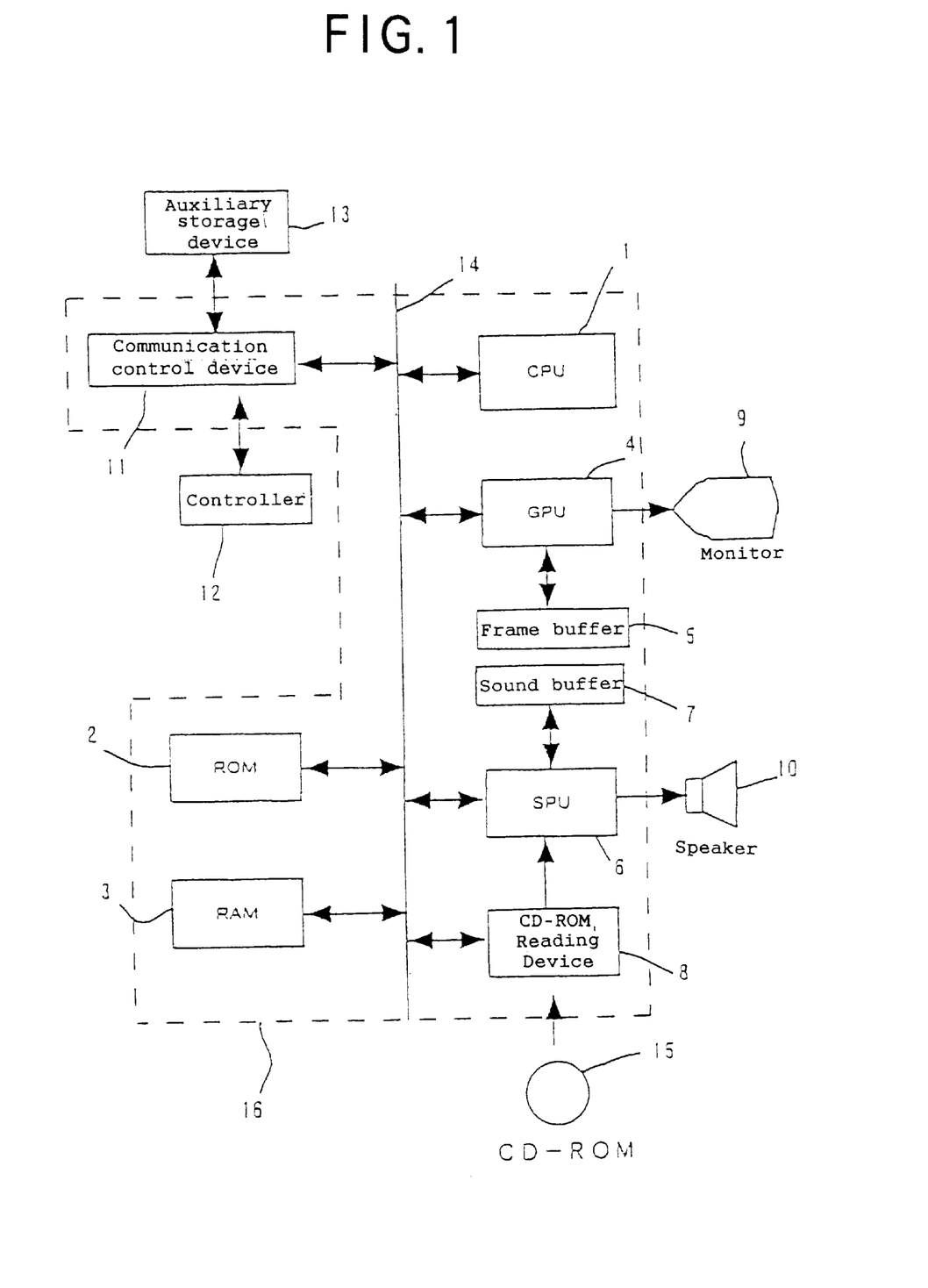
FIG. 1 is a diagram showing the schematic structure of a game system according to the present invention.

FIG. 1 is a block diagram showing a control system of a household game system with the present invention adopted thereto. The household game system is to perform a predetermined game according to a game program stored in a CD-ROM 15 as a storage medium. The CD-ROM 15 functions as a storage device of the present invention.

The game system comprises a CPU 1 mainly formed by a microprocessor, a ROM 2 and a RAM 3 as main storage devices for the CPU 1, a graphics processing unit (GPU) 4 and a sound processing unit (SPU) 6 for image processing and sound processing, buffers 5 and 7 for these units, and a CD-ROM reading device 8. These respective components unitedly function as a game control device of the present invention.

An operating system as a program necessary for the whole operation control of the game machine is written in the ROM 2. A game program and data read from the CD-ROM 15 as the storage medium is written in the RAM 3 if necessary. The GPU 4 forms an image for a game screen on the frame buffer 5 upon receipt of the image data from the CPU 1 and converts the formed image data into a predetermined video reproducing signal so to output the same to a monitor 9 at a predetermined timing. The GPU 4 and the monitor 9 function as an image display device in the present invention. The SPU 6 reproduces the sound data which is read from the CD-ROM 15 and which is recorded in the sound buffer 7 and outputs the same to a speaker 10. The SPU 6 and the speaker 10 function as a sound reproducing device in the present invention. The CD-ROM reading device 8 reads out the program and data recorded on the CD-ROM 15 according to an instruction from the CPU 1 and outputs signals corresponding to the read out content. The CPU 1 is to detect a failure in reading data, and when detecting the failure, it copes with the failure by the dramatic performance relative to the world of a game. A program and data necessary for the performance of a game is stored in the CD-ROM 15. Generally, a household television is used as the monitor 9 and an internal speaker of the television is used as the speaker 10.

A communication control device 11 is connected to the CPU 1 through a bus 14, and a control device 12 and an auxiliary storage device 13 are connected to the same device 11 in a removable way. The control device 12 functions as an input device, and an operational member for receiving an operation by a player is provided there. The communication control device 11 scans the operation state of the operational member of the control device 12 at a predetermined period (for example, 1/60 sec.) and outputs the signal corresponding to the scanned result to the CPU 1. The CPU 1 judges the operation state of the control device 12 based on the signal. A plurality of control devices 12 and auxiliary storage devices 13 can be connected to the communication control device 11 in parallel.

In the above structure, the components other than the monitor 9, the speaker 10, the control device 12, the CD-ROM 15 and the auxiliary storage device 13 are accommodated in a predetermined housing so as to form the main body of the game machine 16.

In the game system having the above structure, the game program stored in the CD-ROM 15 is loaded into the RAM 3 and executed by the CPU 1, thereby playing games of various types on the screen of the monitor 9. In this embodiment, the CD-ROM 15 stores not only the program necessary for performing a golf game in the game system, but also the image data corresponding to the image of each scene during the game, sound data A corresponding to the sound to be reproduced in each scene, sound data B corresponding to the sound to be reproduced in the case of detecting a failure in reading out the sound data A, and the music data such as the BGM (Back Ground Music).

Figure 2A:
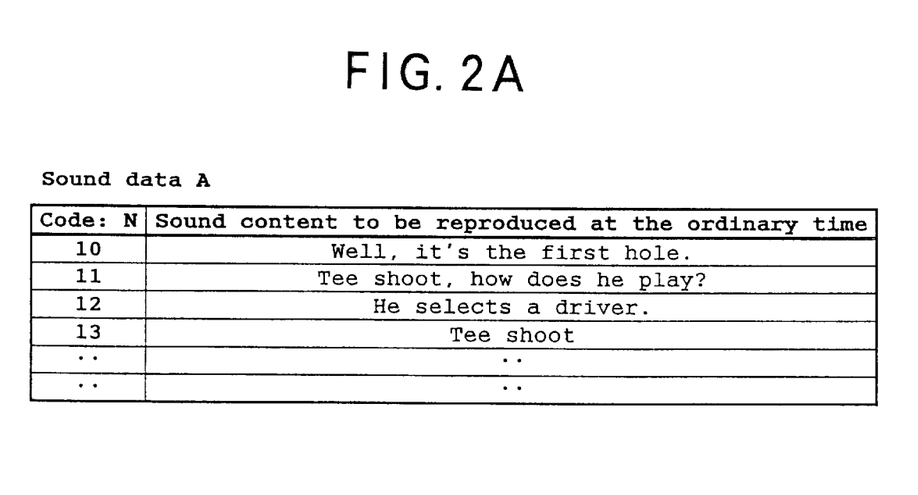
FIGS. 2(A) and 2(B) are diagrams showing the contents of sound data A and sound data B.

FIG. 2(A) shows an example of the content of the sound data A, indicating the live commentary by an announcer to be reproduced in some scene. As shown in FIG. 2(A), the live commentary is divided by the sentence and a predetermined code (N) is attached to each data. The sound data A includes various sound contents other than this.

Figure 2B:
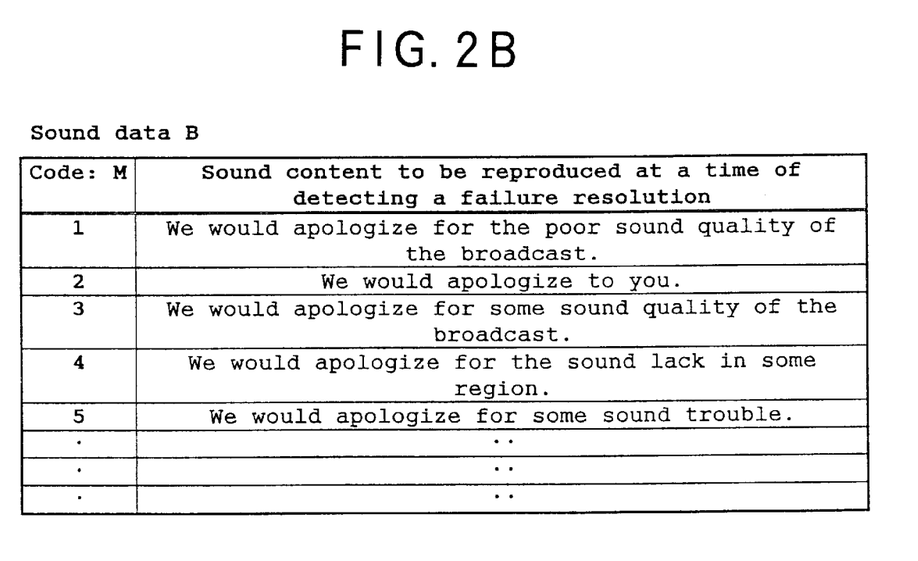

FIG. 2(B) shows an example of the content of the sound data B. The content shown in FIG. 2(B) is the sound to be reproduced in order to make a player believe that some trouble occurred in the world of the game when some disadvantage occurred such as sound lack and sound skip owing to the failure in reading out the sound data A. As shown in FIG. 2(B), a plurality of the sound contents are prepared and a predetermined code (M) is attached to each data. After detecting the failure in reading out the sound data A, one of the codes of the sound data B is decided by a random number by the CPU 1 and reproduced. The sound data B can further include various contents of the sounds such as physical phenomenon like cough and sneeze.

Figure 3:
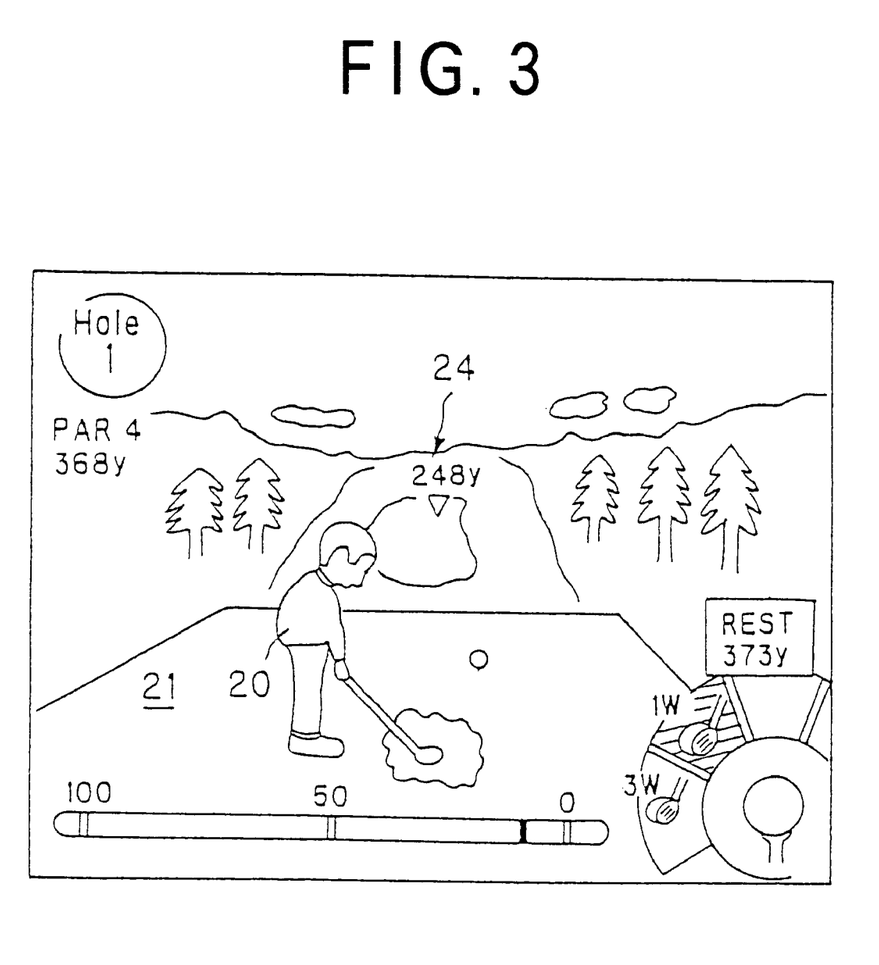
FIG. 3 is a view showing an example of a display image in a scene of shot in a golf game.

FIG. 3 shows an example of a display image in a scene of a shot in the golf game which the present invention is adopted to. FIG. 3 shows the scene of the so-called tee shot. In FIG. 3, a golfer 20 is shown in the center of the tee ground 21 and a course spreads before the golfer 20. A goal point indication 24 is shown substantially in the middle of the course.

Figure 4:
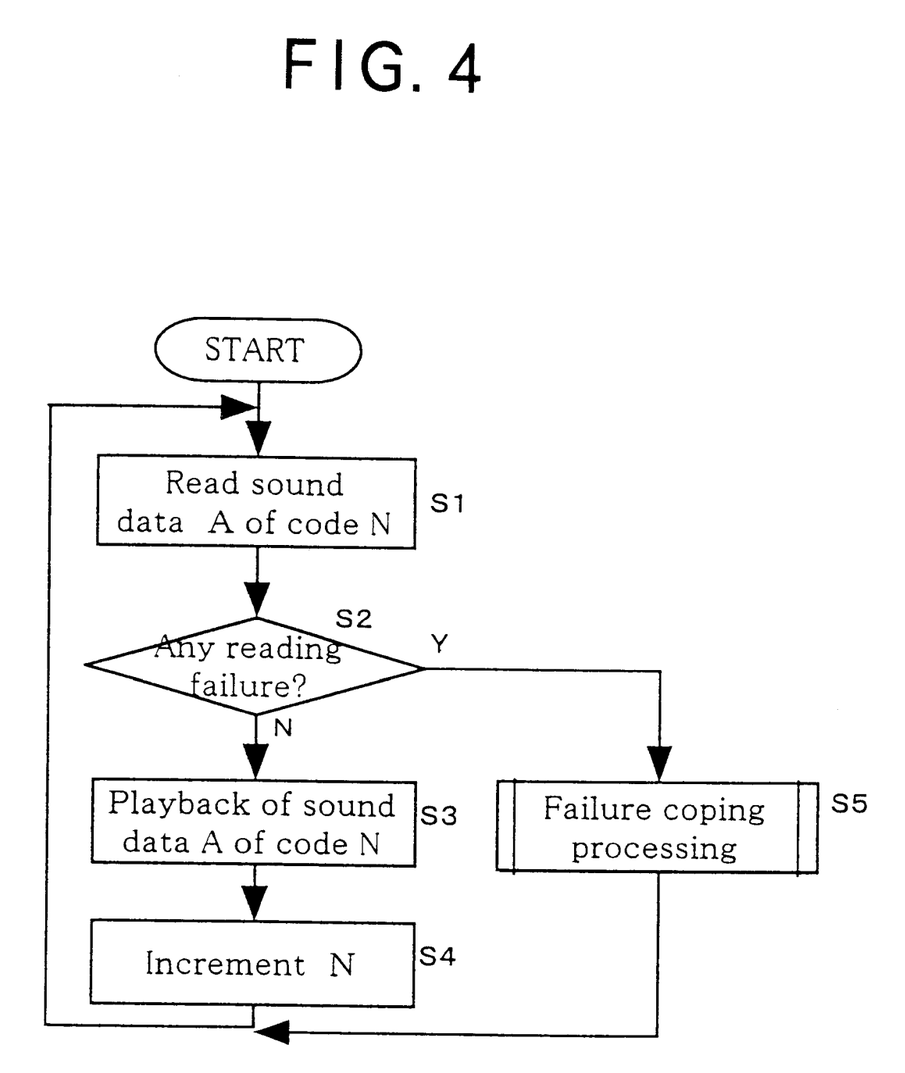
FIG. 4 is a flowchart showing a reading processing of the sound data A in the shot scene of FIG. 3.
Figure 5:
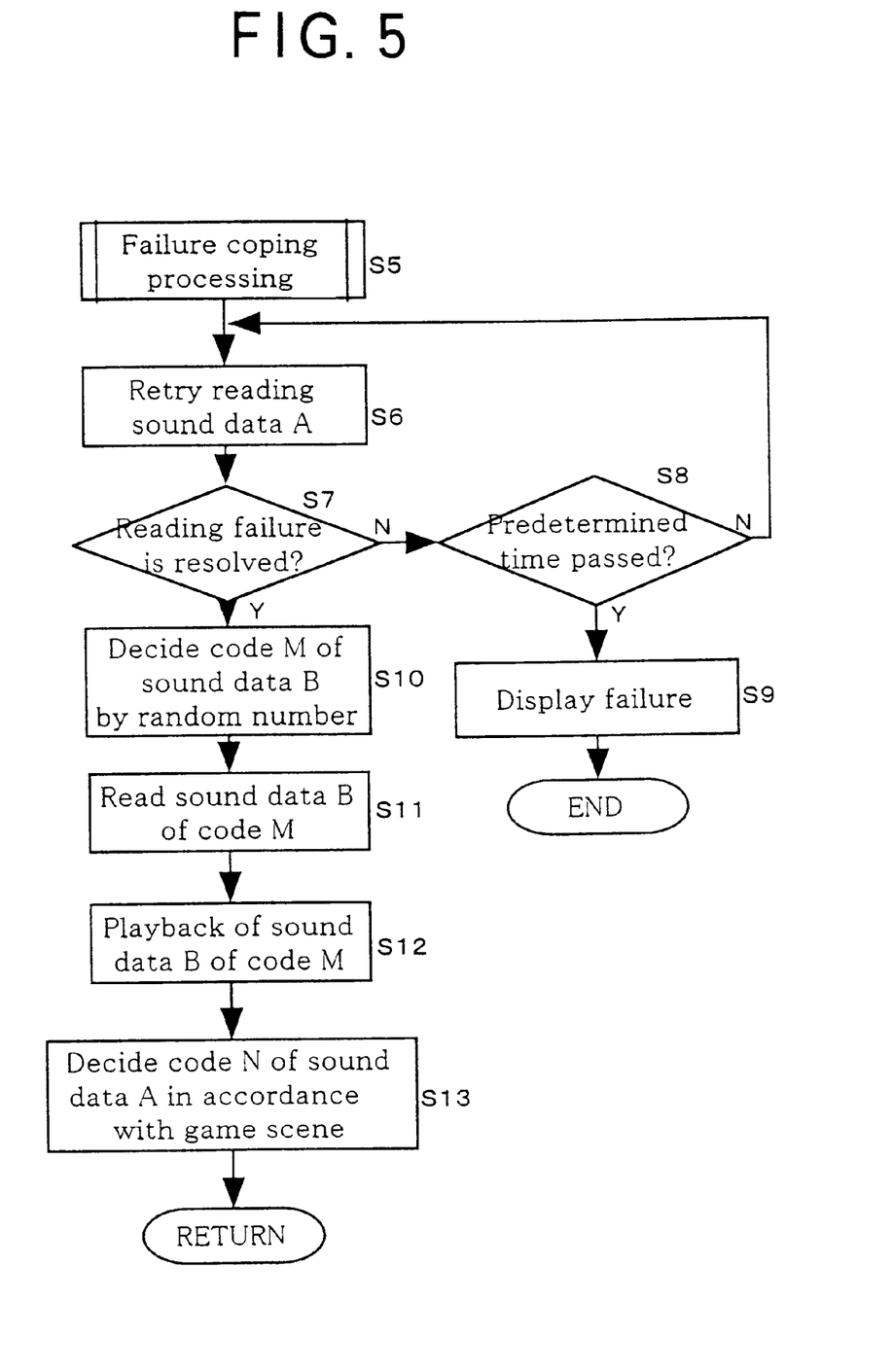
FIG. 5 is a flowchart showing a processing in the case of detecting a reading failure of the sound data A in the processing of FIG. 4.

FIG. 4 is a flow chart showing the processing of reading out the sound data A in the shot scene of FIG. 3. FIG. 5 is a flow chart showing the processing in the case of detecting a failure in reading out the sound data A in the processing of FIG. 4.

In the processing of FIG. 4, at first, an image as shown in FIG. 3 is displayed and the code N (for example, the code 10 shown in FIG. 2(A)) of the sound data A is read out by the CD-ROM reading device 8 (S1). Reading out by the CD-ROM reading device 8 is performed according to an instruction of the CPU 1 and the read out sound data A is once stored in the sound buffer 7. The code No. of the sound data A read out here has been previously decided in the program.

The CPU 1 judges whether a failure in reading out the sound data A occurred or not (S2). This reading failure includes the case of failing to read out the correct data for a predetermined hour from the starting time of reading, the case of failing to read out the data for a predetermined hour from the starting time of reading and the like. When there is no failure in reading out the sound data A, the sound data A is reproduced through the SPU 6 from the speaker 10 (S3). The code N is incremented by the CPU 1 (for example, the code 10 as shown in FIG. 2(A) is incremented into the code 11) (S4). This step is returned to Step S1, where the processing from Step S1 to Step S4 will be repeated. This processing can reproduce the content of the sound data A as shown in FIG. 2(A) ("Well, it's No. 1 hole", "How does he play the tee shot?", "He selects a driver.") in an announcer's voice.

While in the case of detecting a failure in reading out the sound data A at Step S2, the processing will return to Step S5, where the countermeasure against the failure is performed. For example, on the way of reading out the sound data A of the code 13, the reading failure occurs and when the voice to be reproduced from the speaker 9 is cut off like "Tee sho . . . ", the countermeasure against the failure as shown in FIG. 5 is taken.

In the processing of FIG. 5, reading out the sound data A having the reading failure is retried (S6). Sequentially, the CPU 1 judges whether the reading failure has been resolved or not (S7). Namely, it is judged whether the sound data A has been correctly read out or not. When the reading failure has not been resolved, the CPU 1 judges whether a predetermined hour has elapsed since the start of the retry, at Step S8. When the predetermined hour has not elapsed yet, this step will be returned to Step S6, where reading out the sound data A is once more performed and whether the reading failure has been resolved or not is again judged. Thus, reading out the sound data A (retry) is performed at Step S6 until it is judged that the reading failure has been resolved or until it is judged that the predetermined hour has elapsed at Step S8. When it is judged that the predetermined hour has elapsed at Step S8, a message to the effect that some failure occurred is displayed on the monitor 9 (S9).

In Step S6, instead of the retry processing, initializing processing may be performed only on the control portion related to the reading of the sound data by the CD-ROM reading device 8.

While, when it is judged that the reading failure has been resolved at Step S7 (when detecting the resolution of the reading failure), the CPU 1 decides the code of the sound data B by the random number (S10). For example, the code No. 3 as shown in FIG. 2(B) is decided. Sequentially, the sound data B of the decided code is read out (S11) and reproduced through the SPU 6 from the speaker 10 (S12). Thus, the voice from the speaker 9 is cut off like "Tee sho . . . " because of the occurrence of the reading failure of the sound data A corresponding to the code No. 13 shown in FIG. 2, and thereafter the sound data B "We would apologize for the poor sound quality of the broadcast" is reproduced in an announcer's voice. Thus, the disadvantage of the sound can be treated as if it happened in the world of a game and a player can feel like this. Accordingly, even in the case of the reading failure of the sound data A, a game can be advanced without making a player irritated or in disgust and without destroying the world of the game.

After reproducing the sound data B, the CPU 1 decides the code of the sound data A corresponding to the image displayed on the monitor 9 (S13), and this step will be returned to Step S1 of FIG. 4. Namely, since the game itself is in progress regardless of the reproduction of the sound, the running commentary is resumed in accordance with the advanced condition of the game.

Figure 6:
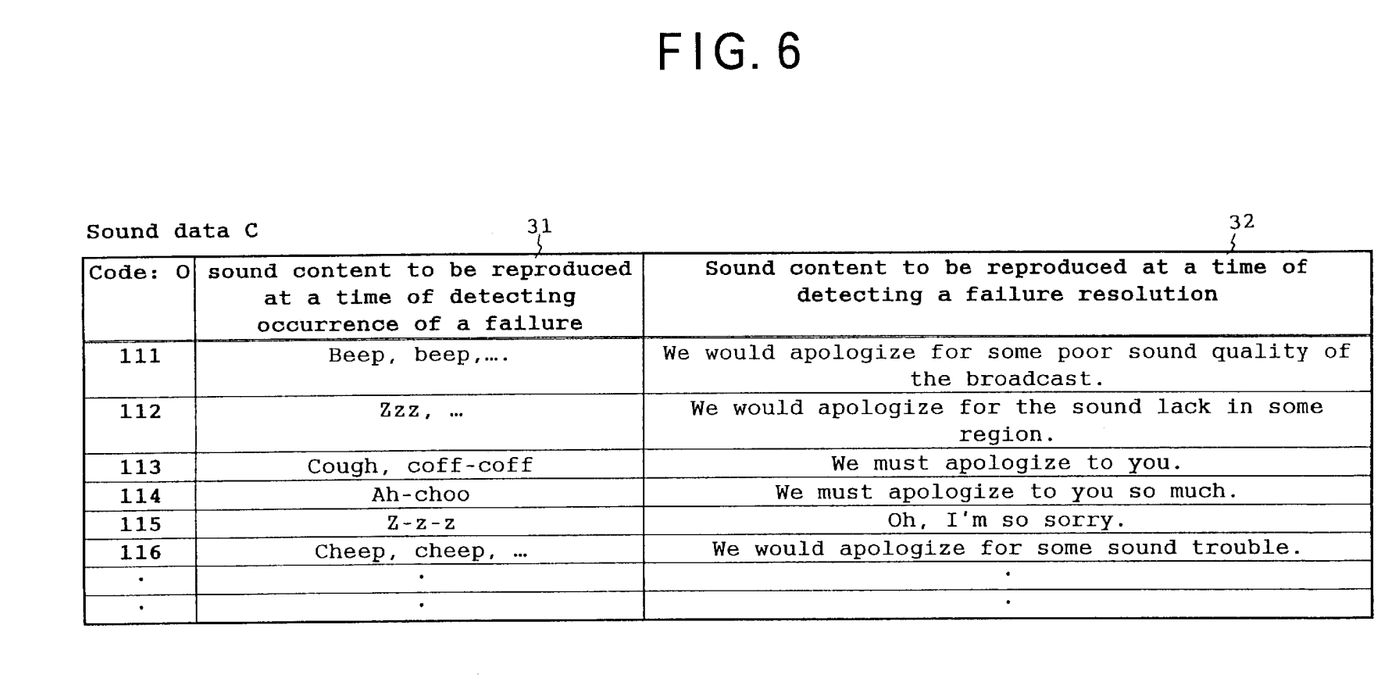
FIG. 6 is a diagram showing the content of sound data C.

In the processing of the countermeasure against a failure (S5), a step for programmatically reproducing an effective sound (for example, noise, cough, hack, sneeze, and snore) can be added before Step S6. This effective sound data is the data previously stored into a predetermined region of the reading sound buffer 7 from the CD-ROM 15 at a predetermined time before detecting the reading failure of the sound data A. FIG. 6 shows an example of the sound data C for use in the case of adding the step for reproducing this effective sound. As shown in FIG. 6, the sound data (the data of the effective sound) to be reproduced in detecting the occurrence of a failure in a portion of a reference numeral 31 corresponds to the sound data to be reproduced in detecting the resolution of the failure in a portion of a reference numeral 32. A plurality of combinations of the sound data are prepared and a predetermined code (O) is added to each combination. In this case, when the reading failure of the sound data A is detected, the code of the sound data C is decided by the CPU 1 by the random number. For example, when a code 112 shown in FIG. 6 is decided, the sound from the speaker 9 is cut off like "Tee sho . . . " and just then the effective sound "zzz . . . " corresponding to the code 112 is read out from the sound buffer 7 and reproduced. After detecting the resolution of the failure at Step S7, the sound data C corresponding to the code 112 is read out from the CD-ROM 15 in the processing of Step S11, and the announcement "We would apologize for the lack of the sound in some region" is reproduced in the processing of Step S12. Thus, it is possible to reproduce the effective sound in accordance with the reading failure during the period from the occurrence of the reading failure to the return. Such effective sound can be repeatedly reproduced from the detection of the reading failure of the sound data A to the detection of the resolution of the reading failure.

Figure 7:
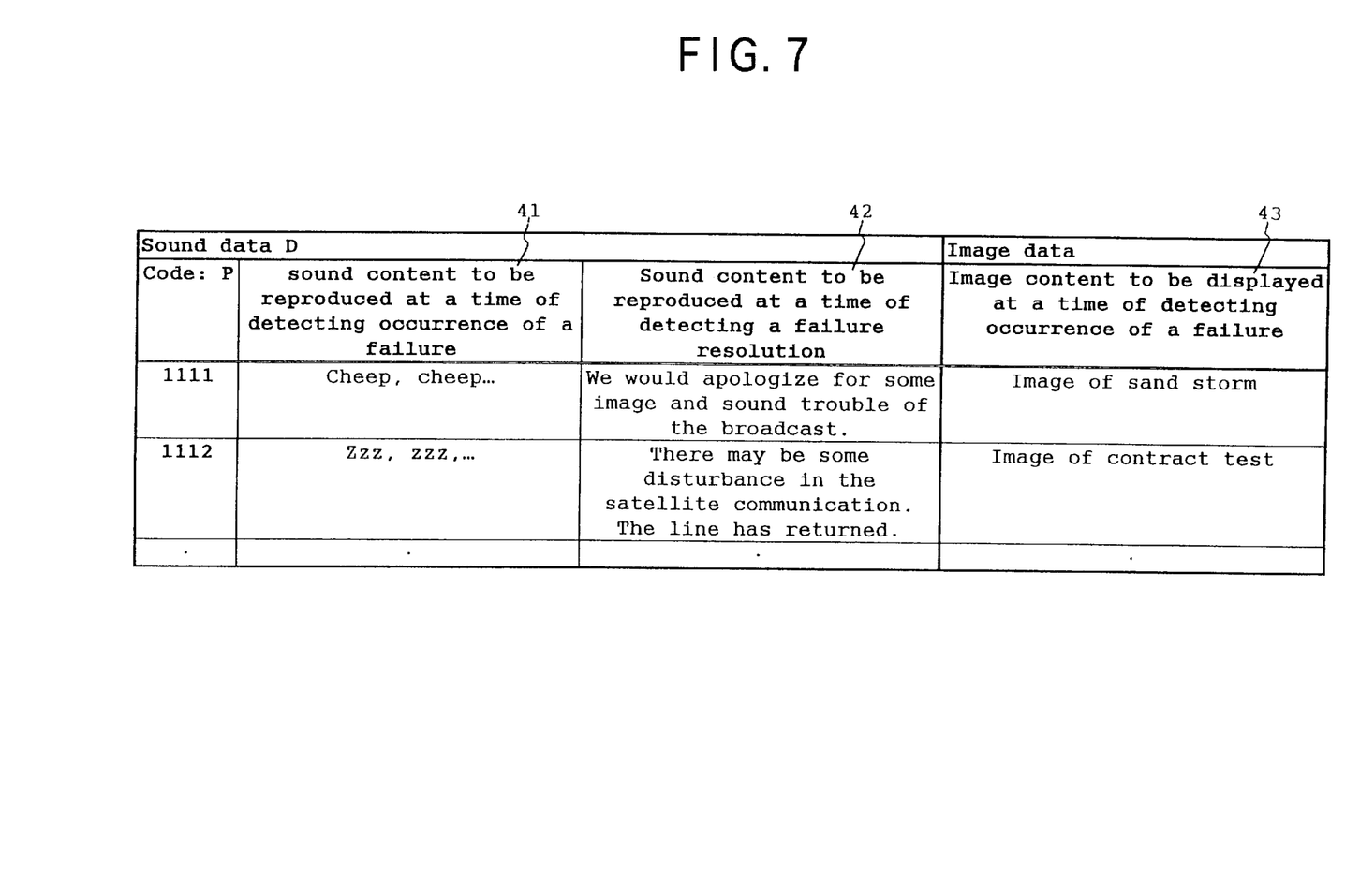
FIG. 7 is a diagram showing the content of sound data D and image data.

Further, in the processing of the countermeasure against the failure (S5), a step for programmatically disturbing an image of the monitor 9 as well as programmatically reproducing the effective sound can be added before Step S6. This effective sound data is the data previously stored into a predetermined region of the reading sound buffer 7 from the CD-ROM 15 at a predetermined time before detecting the reading failure of the sound data A. FIG. 7 shows an example of the sound data and the image data for use in the case of adding the step for reproducing the effective sound and the step for disturbing the image. As shown in FIG. 7, the sound data (effective sound data) to be reproduced in detecting the occurrence of a failure in a portion of a reference numeral 41 and the image data (signal for disturbing an image) to be displayed in detecting the occurrence of a failure in a portion of a reference numeral 43 correspond to the sound data to be reproduced in detecting the resolution of the failure in a portion of a reference numeral 42. A plurality of the combinations of the sound data and the image data are prepared and a predetermined code (P) is attached to each combination. In this case, when detecting the reading failure of the sound data A, the code of the sound data D and the image data are decided by the CPU 1 by the random number. For example, when a code 1111 shown in FIG. 7 is decided, just after the sound from the speaker 9 is cut off like "Tee sho . . . ", the effective sound (sine waveform) "cheep, cheep, . . . " corresponding to the code 1111 is read out from the sound buffer 7 and reproduced and the image of the monitor 9 is disturbed by a signal of the CPU 1 like a sand storm. Sequentially, after detecting the resolution of the failure at Step S7, the sound data D corresponding to the code 1111 is read out from the CD-ROM 15 in the processing of Step S11 and an announcement "We would apologize for the image and sound lack of the broadcast" is reproduced in the processing of Step S12. This effective sound can be repeatedly reproduced during the period from the detection of the reading failure of the sound data A to the detection of the resolution of the reading failure. The image of the sand storm can be continuous during the period from the detection of the reading failure of the sound data A to the detection of the resolution of the reading failure. This structure can make a player feel as if it were wave disturbance with a more feeling of being at a live performance. The image of the monitor 9 may be formed not only by the sand storm and the broadcasting test screen (contrast test screen) but also by destroying the image itself, destroying the color, or feeding every frame.

When the reading failure is detected at a pause in the announcer's words, the operation will move to the processing of the countermeasure against the failure (S5), and after confirming the resolution of the failure at Step S7, for example, the voice of another man such as would be heard at a distance can be reproduced like "xxx anou . . . , xxx anou . . . " (giving the impression of off-mike), and thereafter a sleepy voice of the announcer can be reproduced like "Yawn, hmm, huh?".

Instead of the CPU 1 deciding the codes of the sound data B, the sound data C, the sound data D and the image data as described in the above by the random number, the code may be decided depending on a predetermined condition, for example, the scene of the game. Although the sound data to be reproduced in detecting the occurrence of a failure (including the image data in FIG. 7) is conformed to the sound data to be reproduced in detecting the resolution of the failure, by the code, in FIGS. 6 and 7, this correspondence need not be done. Without doing this correspondence, the code of the sound data (or the image data) to be reproduced should be decided at the both time of detecting the occurrence of a failure and detecting the resolution of the failure.

In these ways, in the processing of the countermeasure against a failure shown in FIG. 5, various performances related to the world of a game can be done at a time a reading failure of the sound data occurs, other than the above-mentioned performances.

Although the description has been made in the case where the present invention is adopted to a golf game in the above embodiment, the present invention is not restricted to a golf game, but it can be adopted to various sport games such as baseball, soccer, wrestling and the like, horse racing, a bicycle race and so on. Further, the present invention can be adopted to various games such as a role playing game and an adventure game in which the words of a character are reproduced. When a reading failure occurs at a time of reproducing not only the sound but also the BGM music, the present invention can be adopted so to reproduce the scratched effective sound.

Moreover, in the above mentioned embodiment, the storage medium of the game program is explained as a CD-ROM, but the present invention is not restricted to this. The invention can be adopted, for example, in a game system employing an external ROM cartridge which holds a semiconductor memory (ROM, EP-ROM or the like).

The present invention can be adopted not only at a time of failing to read out the sound data but also at a time of detecting a failure in a game system capable of detecting some failure during the game by the hardware or software. For example, the present invention can be adopted also at a time of detecting the opening of a cover when the cover of the CD-ROM driver is open.

As described above, according to the present invention, it is able to advance a game without producing any disgust or irritation to a player and without destroying the world of a game even if there occurs a reading failure of the sound data.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2000-032756 filed on Feb. 4, 2000 including the specification, claims, drawings and summary is incorporated herein by reference in its entirety.

What is claimed is:

1. A game system comprising:
    a storage device for storing sound data, a game control device for reading the sound data corresponding to a predetermined scene within a game and outputting the same sound data, and a sound reproducing device for reproducing the sound data outputted from the game control device,
    wherein the game control device comprises a failure detecting means for detecting a failure in reading the sound data; and
    failure coping means for coping with the failure by direction somehow related to a world of the game when the reading failure of the sound data is detected.

2. A game system according to claim 1, wherein the direction is to make believe that a disadvantage of sound caused by the reading failure of the sound data is a trouble which happened in the world of the game.

3. A game system according to claim 1 or 2, wherein the failure coping means reads out the sound data corresponding to the sound for making believe that a disadvantage of the sound caused by the reading failure of the sound data is a trouble which happened in the world of the game and outputs the same sound data to the sound reproducing device.

4. A game system according to claim 1, wherein the game system comprises an image display for displaying an image of the game according to a predetermined signal outputted from the game control device, and
    the failure coping means outputs a signal for disturbing the image for making believe that a disadvantage of the sound caused by the reading failure of the sound data is a trouble which happened in the world of the game, to the image display.

5. A game system comprising:
    a storage device for storing sound data, a game control device for reading the sound data corresponding to a predetermined scene within a game and outputting the same sound data, and a sound reproducing device for reproducing the sound data outputted from the game control device,
    wherein the game control device comprises a failure detecting means for detecting a failure in reading the sound data;
    failure resolution detecting means for detecting a resolution of the reading failure of the sound data;
    temporary storing means for reading out the sound data corresponding to effective sound for making believe that a disadvantage of the sound caused by the reading failure of the sound data is a trouble which happened in a world of the game, before the reading failure of the sound data occurs, and temporarily storing the same sound data;
    first failure coping means for reading out the sound data corresponding to the effective sound temporarily stored and outputting the same sound data to the sound reproducing device when the reading failure of the sound data is detected; and
    second failure coping means for reading out the sound data corresponding to the sound for making believe that a disadvantage of the sound caused by the reading failure of the sound data is a trouble which happened in the world of the game and outputting the same sound data to the sound reproducing device when the resolution of the reading failure of the sound data is detected.

6. A game system according to claim 5, wherein the first failure coping means reads out the sound data corresponding to the effective sound and repeatedly outputs the same sound data to the sound reproducing device until the resolution of the reading failure of the sound data is detected by the failure resolution detecting means.

7. A game system according to claim 5 or 6, wherein the second failure coping means reads out the sound data corresponding to the sound data reproduced by the first failure coping means and outputs the same sound data to the sound reproducing device.

8. A game system according to claim 5 or 6, wherein the game system comprises an image display for displaying an image of the game according to a predetermined signal outputted from the game control device, and
    the first failure coping means outputs a signal for disturbing the image for making believe that a disadvantage of the sound caused by the reading failure of the sound data is a trouble which happened in the world of the game, to the image display.

9. A game system according to claim 5 or 6, wherein the game control device reads out the sound data corresponding to a scene within the game after performing the second failure coping means and outputs the same sound data to the sound reproducing device when the scene within the game after performing the second failure coping means advances from the scene within the game before detecting the failure by the failure detecting means.

10. A computer readable storage medium carrying a program which executes a predetermined game, for a game system including a computer, and the program controls the computer to function as:

means for storing the sound data;

means for reading out the sound data corresponding to a predetermined scene within the game and outputting the same sound data;

means for reproducing the outputted sound data;

means for detecting a failure in reading the sound data; and failure coping means for coping with the failure by direction somehow related to the world of the game when detecting the reading failure of the sound data.

11. A computer readable storage medium carrying a program which executes a predetermined game, for a game system including a computer, and the program controls the computer to function as:

means for storing the sound data;

means for reading out the sound data corresponding to a predetermined scene within the game and outputting the same sound data;

means for reproducing the outputted sound data;

means for detecting a failure in reading the sound data;

means for detecting a resolution of the reading failure of the sound data;

means for reading out the sound data corresponding to effective sound for making believe that a disadvantage of the sound caused by the reading failure of the sound data is a trouble which happened in world of the game, before the reading failure of the sound data occurs, and temporarily storing the same sound data;

means for reading out the sound data corresponding to the effective sound temporarily stored and outputting the same sound data to the sound reproducing device when detecting the occurrence of the reading failure of the sound data; and means for reading out the sound data corresponding to the sound for making believe that a disadvantage of the sound caused by the reading failure of the sound data is a trouble which happened in the world of the game and reproducing the same sound data when detecting the resolution of the reading failure of the sound data.

* * * * *